J. H. POOLE & A. D. ABBENZELLER.
CUTTER BAR.
APPLICATION FILED NOV. 11, 1909.
974,595.
Patented Nov. 1, 1910.
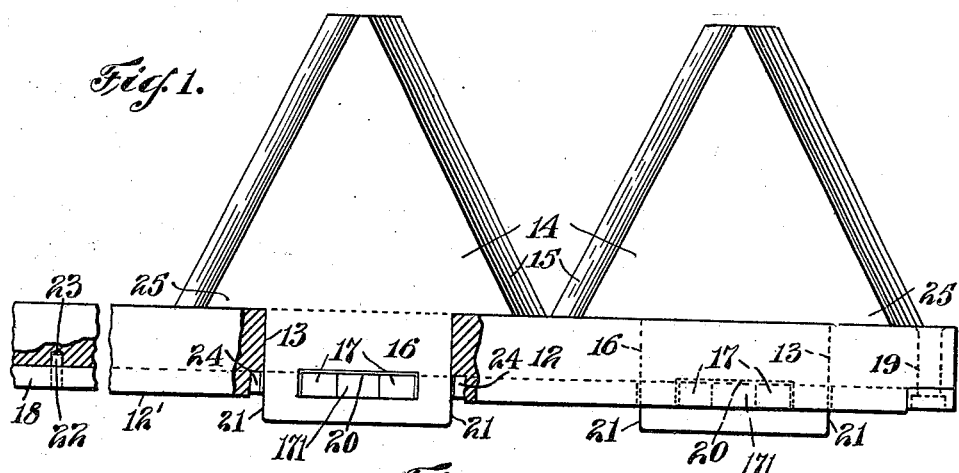
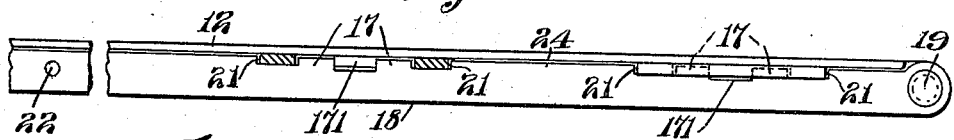
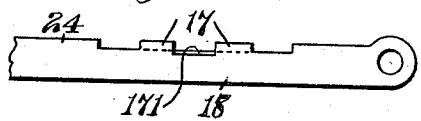
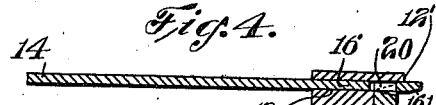
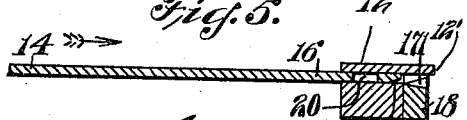
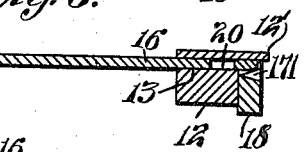
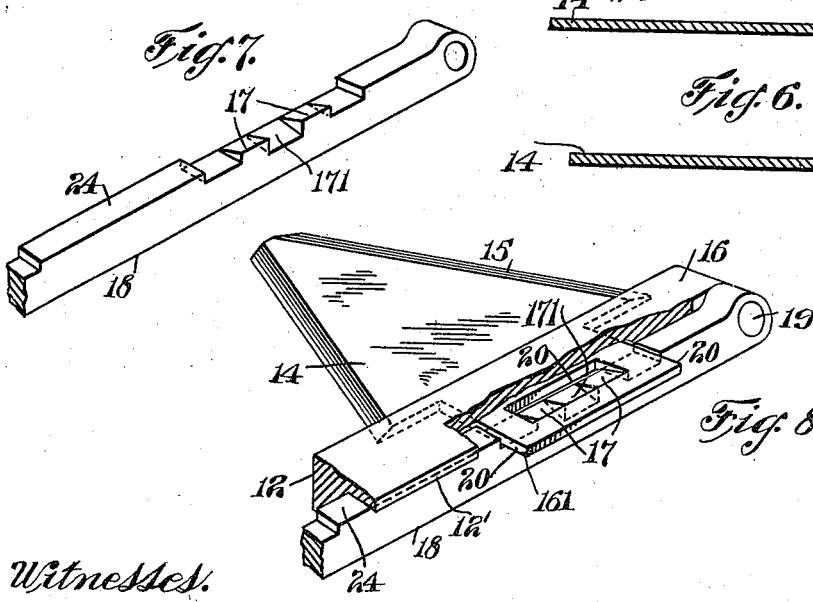
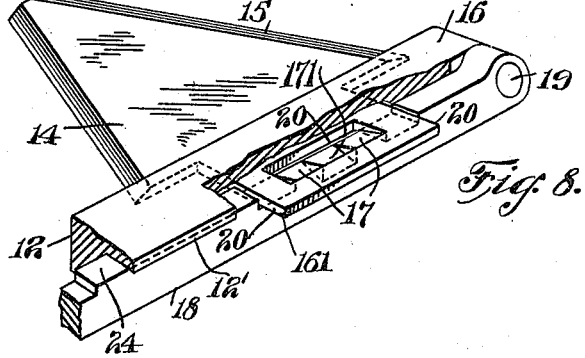
Witnesses:
Inventors
John H. Poole,
Alfred D. Abbenzeller,
By Wright, Brown, Quinby & May
Attys.

UNITED STATES PATENT OFFICE.

JOHN H. POOLE, OF BROCKTON, AND ALFRED D. ABBENZELLER, OF RANDOLPH, MASSACHUSETTS, ASSIGNORS TO BROCKTON MOWING MACHINE CUTTER BAR COMPANY, OF BROCKTON, MASSACHUSETTS, A CORPORATION OF MASSACHUSETTS.

CUTTER-BAR.

974,595.  Specification of Letters Patent.  Patented Nov. 1, 1910.

Application filed November 11, 1909. Serial No. 527,391.

*To all whom it may concern:*

Be it known that we, JOHN H. POOLE and ALFRED D. ABBENZELLER, respectively of Brockton, in the county of Plymouth, and of Randolph, in the county of Norfolk, and State of Massachusetts, have invented certain new and useful Improvements in Cutter-Bars, of which the following is a specification.

This invention relates to a reciprocating cutter bar for a mowing machine, the cutter bar being provided with a series of knives which coöperate with fixed fingers carried by a finger bar on which the cutter bar reciprocates, the cutter bar and its knives being usually supported in a holding frame from which the bar and its knives can be withdrawn endwise.

In former devices of this character which we have produced, there has been provided a cutter bar having a series of transverse slots open at the front side of the bar, a series of knives having slotted shanks formed to enter said slots, and a series of connected locking tongues movable crosswise of the plane of the series of slots in the said bar and adapted to enter or leave the slots of the knife shanks. Such tongues have been carried by a locking bar pivoted at one end of the cutter bar.

One of the objects of our present invention is to provide a structure of this general character which will enable the knives to be slipped into place without changing the relationship of the locking bar and cutter bar, and even without withdrawing the cutter bar as a whole from the holder in which it is mounted in the mowing machine.

Another object of the invention is to provide a structure whereby any knife can be individually removed without disconnecting the locking tongues from the shanks of the other knives.

Another object is to provide an improved structure of cutter bar with an overhanging portion beneath which the locking bar is located and protected in use.

To these ends the invention consists in the construction and combination of parts substantially as hereinafter described and claimed.

Of the accompanying drawings,—Figure 1 represents a top plan view of a portion of a cutter bar embodying our present invention, only two knives being shown. Fig. 2 represents a rear edge view of the same, one of the knife-shanks, however, being in section. Fig. 3 is a detail rear elevation of a portion of the locking bar. Figs. 4, 5 and 6 are detail sectional views illustrating the operation of inserting and removing a knife. Fig. 7 is a perspective view of the portion of the locking bar shown in Fig. 3. Fig. 8 is a detail perspective of the structure shown at the right of Fig. 1.

The same reference characters indicate the same or similar parts wherever they occur.

The cutter bar comprises a main portion or body 12 which is substantially rectangular in cross section, and which has continuous flat upper and lower sides, the said bar being adapted to slide, as usual, in contact with the finger bar of a mowing machine. The body portion 12 is provided with a horizontal flange or shoulder 12′ extending rearwardly, as clearly shown in Fig. 8.

Owing to the upper and lower sides of the cutter bar being flat and continuous, the said bar is adapted to slide in the usual manner, without wearing the bearings in any such manner as would be caused by any set-in pieces, screw holes, pivots or the like.

The cutter bar is provided with a series of slots 13 extending entirely through it from its front to its rear edge, said slots being formed to receive and closely fit the shanks 16 of the knives 14, the latter having cutting edges 15 which are beveled as usual. The slots 13 are in a plane so that their upper surfaces are flush with the under surface of the flange or shoulder 12′, whereby the said flange or shoulder opposes tendency of the knife shanks to tilt upward at the rear, thereby holding the knife shanks firmly in position to be engaged by the locking devices which we will now describe.

A locking bar 18 which is pivotally connected at 19 to one end of the cutter bar, is provided with a series of locking tongues 17 which project upward and coact with slots 20 formed in the knife shanks to hold the knives locked in their positions relatively to the cutter bar when the parts are in the position shown in Fig. 8. The knife-shanks 16 are of a width so that their side edges or shoulders 21 will snugly fit the slots 13 in the cutter bar, and the knives have outwardly projecting shoulders 25 which are adapted to bear on the front side of the cutter bar and limit the rearward movement of the knife-shanks into the cutter bar so that the knives are rigidly supported by the cutter bar against rearward displacement, and are prevented from exerting pressure on the locking bar tending to spring the same rearwardly. This structure also enables the slots 20 in the knife-shanks to be made of a width so that the front wall of the slot of any knife need not bear against the locking tongues. The parts are so proportioned that the shoulders 25 prevent any rearward movement of the knives relatively to the cutter bar, the outer faces of the tongues 17 prevent any forward movement of the knives, and the ends of the tongues 17 engaging the ends of the slot 20 and the shoulders 21 engaging the ends of the slots 13 of the cutter bar, prevent any lateral movement of the knives in a direction lengthwise of the bar.

The tops of the tongues 17 are beveled or inclined forwardly, and preferably (although not necessarily) the under surface of the rear edge of each knife shank is beveled at 161. Chiefly owing to the fact that the tops of the tongues 17 are beveled or inclined, a knife can be inserted while the bar 18 is in the closed position shown in Fig. 8, because said bar will spring sufficiently to yield downwardly and let the knife-shank pass back far enough so that the tongues 17 will snap into the slot 20. Of course a suitable tool may be employed if necessary to drive the knives rearwardly to their seats. It is to be understood that while the tongues 17 are illustrated as comprising two separated projections for each knife-shank, the said two projections may be united as one. That is, while the structure illustrated shows a depression 171 at the center, said depression may be omitted. This depression is simply to enable a pointed instrument, such as the tip of a screw-driver, to be inserted underneath the center of the rear edge of a knife-shank, and then operated so as to slightly bend or flex the bar 18 downwardly sufficiently to withdraw the locking tongue or tongues from the slot 20 so that any individual knife can be pushed or driven forward and removed for repairing or sharpening or replacement by a new one, or for any other purpose.

Fig. 4 illustrates the knife as firmly secured in position.

Fig. 5 illustrates the relative positions of the parts when a knife is about to be driven in, in the direction of the arrow, the seating movement not having proceeded far enough to bend or flex the bar 18.

Fig. 6 illustrates the relative positions of the parts as the bar is being bent or flexed downward by the movement of a knife in the direction of the arrow. Further movement of the knife in the same direction will result in the parts automatically assuming the relative positions shown in Fig. 4.

To hold the locking bar in its closed position along the rear of the cutter bar and underneath the flange or shoulder 12, any suitable latch or lock mechanism may be employed, as for instance (see Fig. 1) a pin 22 projecting from the bar 18 and adapted to snap into a socket 23 in the body 12 of the cutter bar.

In the drawings we have shown the locking bar 18 as having projections 24 between the locking tongues 17, but said projections 24 may be omitted if desired.

It will now be understood that the construction described and illustrated provides a very strong cutter bar which requires very little broaching to form the slots 13, and very little milling to form the tongues 17 on the bar 18. And the knives are exceedingly simple and require little machine work in their manufacture.

We claim:—

1. A cutter bar having a series of transverse slots open at the front side of the bar, a series of knives having slotted shanks to enter the slots of the bar, and a resilient yieldable locking bar movable perpendicularly to the plane of said slots and having a series of tongues to enter the slots in said shanks, the tops of said tongues being beveled to permit the insertion of a knife while said bar is in locking position.

2. A cutter bar having a series of transverse slots open at the front side of the bar, a series of knives having slotted shanks to enter the slots of the bar, and a resiliently yieldable locking bar movable perpendicularly to the plane of said slots and having a series of tongues to enter the slots in said shanks, the tops of said tongues being beveled, and the outer surface of the knife shanks being beveled to permit the insertion of a knife while said locking bar is in locking position.

3. A cutter bar having a series of transverse slots and provided with a flange above the plane of said slots, a series of knives having slotted shanks to enter said bar slots and arranged to bear on the under side of said flange, and a locking bar having tongues to enter the slots of the knife shanks, said locking bar being secured to said cutter bar below said flange and disposed in the angle between said flange and the rear of the cutter bar when in locking position.

4. A cutter bar having a series of transverse slots, a series of knives having slotted shanks to enter the slots of the bar, and a locking bar resiliently yieldable relative to said cutter bar and provided with beveled tongues to enter the slots of the knife shanks, said tongues having depressions between them to permit the insertion of a tool for removing a blade while said bar is in locking position.

5. A cutter bar having a series of transverse slots open at the front side of the bar, a series of knives having slotted shanks formed to enter said slots of the bar, and a resiliently yieldable locking bar secured to the cutter bar and provided with a series of locking tongues to enter slots of the knife-shanks to engage or release all the knives, the tops of said tongues being beveled to permit insertion of a knife while said bar is in locking position.

6. A cutter bar having a series of transverse slots and provided with a flange above the plane of said slots, a series of knives having slotted shanks to enter said bar slots, and arranged to bear on the under side of said flange, and a resiliently yieldable locking bar having tongues to enter the slots of the knife shanks, said locking bar being secured to said cutter bar beneath said flange, and said tongues having their upper face beveled to permit insertion of a knife while said bar is in locking position.

In testimony whereof we have affixed our signatures, in presence of two witnesses.

JOHN H. POOLE.
ALFRED D. ABBENZELLER.

Witnesses:
C. F. BROWN,
P. W. PEZZETTI.